Aug. 19, 1969  M. J. WACLAWEK  3,461,670
HYDRODYNAMIC TORQUE CONVERTER

Filed Dec. 27, 1967  2 Sheets-Sheet 1

INVENTOR
MICZYSLAW J. WACLAWEK
BY Robert H. Johnson
ATTORNEY

Aug. 19, 1969    M. J. WACLAWEK    3,461,670
HYDRODYNAMIC TORQUE CONVERTER
Filed Dec. 27, 1967    2 Sheets-Sheet 2

*INVENTOR*
MICZYSLAW J. WACLAWEK
BY Robert H. Johnson
ATTORNEY

United States Patent Office 3,461,670
Patented Aug. 19, 1969

3,461,670
HYDRODYNAMIC TORQUE CONVERTER
Miczyslaw J. Waclawek, Burlington, Iowa, assignor to Clark Equipment Company, a corporation of Michigan
Filed Dec. 27, 1967, Ser. No. 693,974
Int. Cl. F16h 41/14
U.S. Cl. 60—54
6 Claims

ABSTRACT OF THE DISCLOSURE

A hydrodynamic torque converter having an impeller, a turbine, a fixed reactor, a rotatable reactor and a brake actuatable in response to fluid pressure in a portion of the torque converter to retard rotation of the rotatable reactor.

Background of the invention

The field of art to which this invention relates includes power plants, and more specifically rotary fluid transmissions.

While the use of a hydrodynamic torque converter in the power train of front end loaders generally is advantageous, there has been one serious disadvantage. In order to fill the bucket of a front end loader, it usually is "crowded" into a pile of material with the torque converter operating at or near stall and at the same time the bucket is lifted and rolled back. Under these conditions of operation the pump which supplies pressurized fluid to the motors for lifting and rolling back the bucket requires up to 50% of the available engine torque, thereby leaving 50% of the engine torque available for driving the torque converter. Because of an inherent characteristic of all torque converters, namely, absorption of power which is expressed as a K factor, the speed at which the torque converter impeller can be driven decreases as engine or input torque delivered to the impeller decreases. Thus, in a torque converter having a given K factor at stall, the engine will drive the impeller at 2,000 r.p.m. when a given torque is delivered to the impeller (which, for example, may be 100% of engine torque), but when only 50% of this torque is delivered to the impeller, the impeller is driven at only 1,600 r.p.m., and so engine speed is pulled down to 1,600 r.p.m. This drop in engine speed is most undesirable because it results in a substantially lower volume of fluid being pumped since the pump speed varies directly with engine speed which means that the rate of speed at which the bucket can be raised and rolled back for loading is substantially reduced.

The general approach to overcoming this problem has been to select a torque converter with a K factor at stall such that the torque converter cannot use all of the available engine torque at the governed engine speed, for example, 2,000 r.p.m. Then, when there is a demand by the pump for torque there will be a smaller drop in engine r.p.m. due to the torque converter power absorption. It is obvious that this approach is only a compromise which results in having engine torque available which the torque converter cannot use when there is no demand by the pump on the engine for torque in return for having a smaller engine r.p.m. drop when there is a peak demand by the pump for torque from the engine.

In order to overcome the problem which is described above, it is a principal object of my invention to provide a torque converter which at stall has a substantially constant absorption speed for a given range of input torque.

Summary of the invention

In carrying out my invention in a preferred embodiment there is provided a hydrodynamic torque converter having an impeller, a turbine, a fixed reactor and a reactor mounted for rotation. A fluid pressure actuated friction brake is responsive to fluid pressure in a portion of the torque converter and actuatable to retard rotation of the one reactor completely or partially or permit the reactor to spin free.

The above and other objects, features and advantages of my invention will be more easily understood by persons skilled in the art when the detailed description is taken in conjunction with the drawing.

Description of the preferred embodiment

Figure 1:
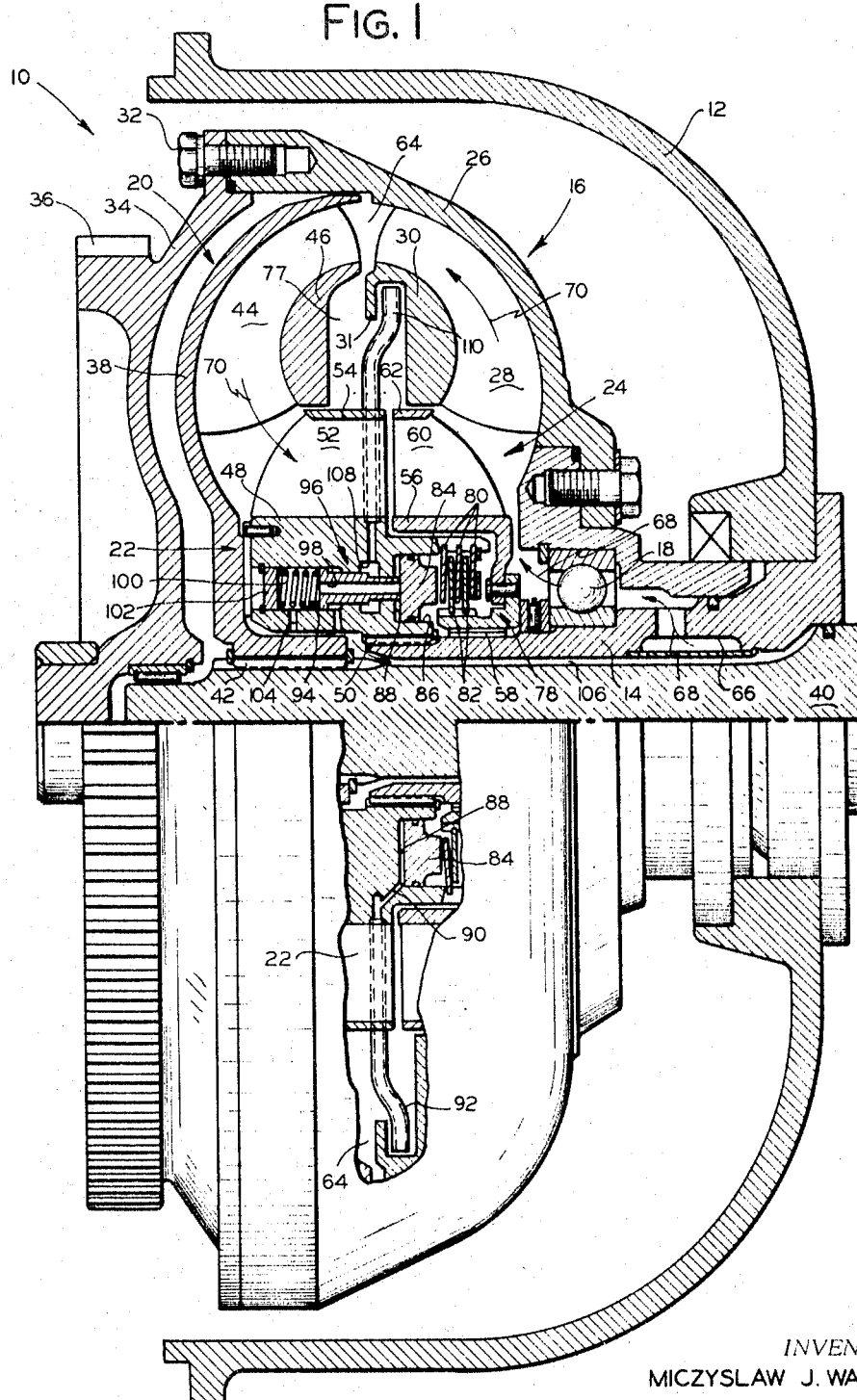
FIGURE 1 is a longitudinal section of a preferred embodiment of my invention.

Referring now to FIG. 1, the reference numeral 10 denotes generally a hydrodynamic torque converter having a housing 12 to which a stationary support 14 is connected. Disposed generally within housing 12 is an impeller 16 which is mounted for rotation on support 14 by means of a bearing 18, a turbine 20, a reactor 22 and a reactor 24.

Impeller 16 includes a generally dish-shaped shell 26 to which a plurality of blades 28 are connected and a support ring 30 which connects blades 28 inwardly of shell 26. It will be noted that ring 30 includes a radially inwardly extending lip 31. Also connected to impeller 16 by means of a plurality of machine screws 32 is a generally dish-shaped input drive and support member 34 which has integral therewith a ring gear portion 36 which is adapted to be drivingly connected to the flywheel of a suitable source of power such as an internal combustion or diesel engine.

Turbine 20 includes a generally dish-shaped shell 38 which is splined to an output shaft 40 at 42. Connected to shell 38 is a plurality of curved blades 44. A support ring 46 is connected to blades 44 inwardly of shell 38.

Reactor 22 includes a hub 48 splined to stationary support 14 at 50, a plurality of curved blades 52 connected to hub 48 and a support ring 54 connected to blades 52 radially outwardly of hub 48.

Reactor 24 includes a hub 56 which is generally U-shaped in cross-section and is mounted for rotation on support 14 by means of a bushing 58. A plurality of curved blades 60 are connected to hub 56 and a support ring 62 is connected to blades 60 radially outwardly of hub 56.

At this point it will be seen that impeller 16, turbine 20 and reactors 22 and 24 define together a toroidal chamber 64 which is adapted to be filled with fluid supplied by a pump, not shown, through a fluid passage 66 in stationary support 14 and past bearing 18, as shown by arrows 68. By driving impeller 16 blades 28 cause fluid contained in toroidal chamber 64 to be circulated to impinge on blades 44 of turbine 20, thereby causing turbine 20 to rotate in the same direction as impeller 16 so that power is transmitted from impeller 16 to turbine 20. As fluid flows past reactors 22 and 24 the direction of fluid flow is changed, providing a torque multiplication as is conventional and well-known in this art. The direction of fluid flow in toroidal chamber 64 is indicated by arrows 70. If reactor 24 is permitted to rotate freely when torque converter 10 is in operation, then reactor 24 has no effect upon the operation of torque converter 10 and the torque converter functions as though only reactor 22 is in the fluid flow circuit with the result that the angle at which fluid enters blades 28 corresponds substantially to the angle at which it leaves blades 52 of reactor 22. When this is the situation, then the K factor of torque converter 10 can be represented by the curve labeled 72 on the graph shown in FIG. 3. By reference to the graph shown in FIG. 3 it will be apparent that when reactor 24 is being permitted to rotate freely that for a given input or engine torque being supplied to impeller 16 that the impeller speed will be 2,000 r.p.m. since the curve 72 representing the K factor at stall intersects the input torque curve 74 at 76.

Rings 30, 46, 54 and 62 define an inner chamber 77 which is surrounded by toroidal chamber 64 and is filled with fluid from toroidal chamber 64. The pressure of the fluid at any given radius in chamber 77 equals the pressure being generated by the pump supplying pressurized fluid to the toroidal chamber 64 (which can be considered constant for the normal operating range of impeller speed) plus the pressure caused by the centrifugal force of the fluid at the given radius due to the rotational movement being imparted to the fluid by rotation of the rings. In the area of chamber 77 between lip 31 and the adjacent portion of ring 30 the fluid is rotating at substantially impeller speed. Consequently, the fluid pressure in this area varies directly as impeller speed varies. The importance of this will become apparent when the operation of my invention is explained.

Torque converter 10 also includes a conventional fluid pressure actuated multiple plate friction brake 78 which is arranged to connect reactor 24 to hub 48 of reactor 22. Brake 78 can be applied so that reactor 24 can be held from rotation, permitted to spin freely or retarded at any point between these two extremes. Brake 78 includes a plurality of interleaved friction plates 80 and 82 which are splined respectively to hub 48 and hub 56, as shown. These plates serve to frictionally connect hub 56 to hub 48 as the plates are pressed together, with the frictional connection increasing as the force pressing the plates together is increased.

An annular piston 84 is slidably disposed in a bore 86 in hub 48 and defines with bore 86 a chamber 88 which is adapted to be supplied with pressurized fluid from the portion of chamber 77 between lip 31 and the adjacent portion of ring 30 by means of a fluid passage 90 which communicates with a tube 92 connected to reactor 22 and having the open end thereof disposed in chamber 77 between lip 31 and ring 30, as shown. It will now be apparent that pressurized fluid is supplied to chamber 88 through fluid passage 90 and tube 91 and tends to actuate piston 84 toward the right, as viewed in FIG. 1 to press plates 80 and 82 together, causing engagement of brake 78.

Disposed in hub 48 is a step bore 94 which communicates with chamber 88, as shown. Slidably disposed in step bore 94 is a step valve 96. Step valve 96 includes a fluid passage 98 which extends between the ends thereof, as shown. Also, a low rate spring 100 is disposed in step bore 94 between one end of valve 96 and a plug 102 in step bore 94 so that the end of step valve 96 remote from spring 100 tends to be resiliently biased into sealing engagement with piston 84. Spring 100 preferably is a very low rate spring in order to maintain a substantially constant fluid pressure limit in toroidal chamber 64, as will be explained in more detail shortly. A fluid passage 104 connects the portion of step bore 94 between plug 102 and step valve 96 with an annular fluid passage 106 which is defined between support 14 and output shaft 40. Fluid passage 106 communicates with a fluid reservoir at or near atmospheric pressure so that the portion of step bore 94 between plug 102 and valve 96 is vented always to the atmosphere.

A groove 108 communicates with step bore 94, as shown, and is adapted to be supplied with pressurized fluid from the portion of chamber 77 between lip 31 and the adjacent portion of ring 30 through a tube 110 connected to reactor 22, as shown. Groove 108 is located so that pressurized fluid supplied thereto can act against the large diameter portion of step valve 96 to tend to move it against the bias of spring 100. When the pressure in groove 108 is sufficiently high enough, the force being exerted on valve 96 is sufficient to overcome the bias of spring 100 so that valve 96 is moved toward the left away from sealing engagement with piston 84, thereby tending to vent the pressurized fluid in chamber 88 to the atmosphere. At this point it should be mentioned that the cross-sectional area of communicating passage 90 is made considerably smaller than the cross-sectional area of tubes 92 and 110 to insure producing a pressure drop between the fluid in tube 92 and chamber 88 so that the pressure acting on the stepped area of valve 96 in groove 108 will be equal to the pressure in chamber 77 adjacent the outer end of tube 110 while the pressure in chamber 88 can assume a value somewhat lower than this pressure. The pressure in chamber 88 is, therefore, controlled by valve 96 so that the speed of reactor 24 produces the required K factor to maintain the engine speed substantially constant with large variation of engine torque as will become more readily apparent when the operation of my invention is explained.

In order to enable persons skilled in the art to better understand my invention, I will now explain the operation of it. It will be assumed that the torque converter 10 is being operated in association with a front end loader and that the engine associated therewith is governed at 2,000 r.p.m. and that the pump also associated therewith is not being operated to supply pressurized fluid to lift and roll back the bucket. Under this condition of operation reactor 24 will be rotating freely because brake 78 will be completely disengaged and torque converter 10 will be operating at point 76 shown on the graph in FIG. 3. The rate of spring 100 is chosen in relation to the force that can be exerted on step valve 96 to move it toward the left by pressurized fluid so that the fluid pressure that can be reached in chamber 77 between lip 31 and ring 30 is maintained at no greater than 61 p.s.i. Thus, with torque converter 10 operating in a state of equilibrium step valve 96 will be permitting a metered amount of pressurized fluid to escape through fluid passage 98 and out through fluid passages 104 and 106. Now if it is assumed that the operator manipulates the controls for the bucket so as to begin to raise and roll back the bucket, there immediately will be a demand by the pump for torque from the engine in order to supply the pressurized fluid to the motors. Assuming that the pump demands 50% of the engine torque, the impeller 16 of torque converter 10 will start to slow down as will be apparent from consulting the graph on FIG. 3. As impeller 16 starts to slow down the fluid pressure in chamber 77 between lip 31 and ring 30 will begin to drop, thereby permitting step valve 96 to move toward the right into sealing engagement with piston 84. When valve 96 moves into fluid sealing engagement with piston 84 the fluid pressure in chamber 88 begins to rise, thereby causing piston 84 to move toward the right and partially engage brake 78. As brake 78 begins to engage there begins to be a resistance to rotation of reactor 24 so that reactor 24 changes the effective outlet angle of the fluid leaving it. This changes the power absorption or K factor at stall of torque converter 10 with the result that the fluid pressure in chamber 77 between lip 31 and ring 30 is raised back up to 61 p.s.i., thereby causing the step valve 96 to open slightly against the bias of spring 100 whereby a small amount of pressurized fluid is metered out of chamber 88, thus stabilizing the fluid pressure in chamber 88 at a level so that piston 84 is maintained in an intermediate position to partially engage brake 78. As the input torque to impeller 16 drops further due to increased demand by the pump to supply pressurized fluid to the motors actuating the lift and roll back of the bucket, the fluid pressure in chamber 77 between lip 31 and ring 30 also drops, thereby permitting valve 96 to move again toward the right into sealing engagement with piston 84 so that the fluid pressure in chamber 88 rises to cause piston 84 to move further toward the right to further engage brake 78 with the result that there is a further resistance to rotation by reactor 24. This further resistance to rotation by reactor 24 again changes the power absorption or K factor at stall of torque converter 10 so that fluid pressure in chamber 77 between lip 31 and ring 30 goes up until it reaches 61 p.s.i. at which time valve 96 will be actuated toward the left and fluid will be metered out of chamber 88 to maintain the piston 84 in the desired location for engagement of brake 78. This process will be continued as the input torque to torque converter 10 drops until brake 78 is fully engaged and reactor 24 is held from any rotation. By choosing the proper outlet angle of blades 60 of reactor 24 the K factor of torque converter 10 can be controlled so that it is represented by curve 112 in FIG. 3 when reactor 24 is held from any rotation and by the straight line 113 between points 114 and 76 as reactor 24 is permitted to rotate with varying retardation by brake 78. At this point it will be obvious from reference to the graph shown on FIG. 3 that as the amount of torque available to drive impeller 16 of torque converter 10 decreases from 100% as indicated by curve 74, to 50%, as indicated by curve 116, that the increasing resistance to rotation of reactor 24 changes the K factor at stall of torque converter 10 in such a manner that impeller speed is maintained substantially constant, as indicated by straight line 113 between points 76 and 114.

Figure 2:
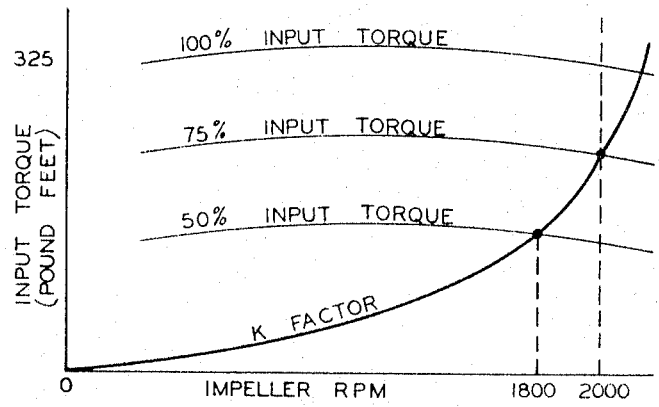
FIGURE 2 is a graph showing the K factor of a given torque converter at stall.
Figure 3:
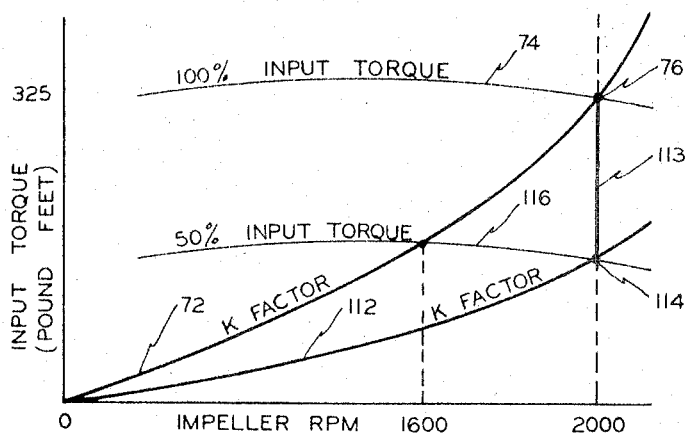
FIGURE 3 is a graph showing the K factor at stall of my invention.

The graph in FIG. 3 should be compared with the graph in FIG. 2 which shows a curve for a K factor at stall of a torque converter which is chosen so that at 2,000 r.p.m. the torque converter can use only about 75% of the available engine or input torque. Thus, when the pump requires only 25% of engine torque for operation of the bucket there will be no drop in engine r.p.m. and the total available torque will be used. However, if the pump requires 50% of engine torque, then it will be possible to drive the torque converter impeller only about 1,800 r.p.m. with the result that the pump output is decreased, with the result that the rate at which the machine can work will be lowered. This is to be compared with the range from 100% of engine torque to 50% of engine torque through which the torque converter of my invention can operate at a substantially constant impeller speed of 2,000 r.p.m. as compared to a conventional torque converter as represented by the graph in FIG. 2 in which there is either available engine torque that the torque converter cannot use or when the torque is being fully utilized there is only one point at which the impeller speed can be maintained at governed engine speed.

Although only a single preferred embodiment of my invention has been shown, it will be understood that this is for purposes of illustration and that my invention is subject to various modifications and changes which would fall within the scope and spirit of it. Consequently, the limits of my invention should be determined from the appended claims.

I claim:

1. A hydrodynamic torque converter comprising an impeller, a turbine, reactor means having a variable effective outlet angle, and means for varying the effective outlet angle of the said reactor means in response to the input torque so that the K factor at stall varies inversely as the input torque varies and the impeller speed remains substantially constant.

2. A hydrodynamic torque converter comprising an impeller, a turbine, a stationary support, a first reactor fixed to the said support, a second reactor mounted for rotation on the said support, the said impeller, turbine and reactors defining a toroidal chamber and an inner chamber adapted to be filled with fluid, means for connecting the said second reactor to the said support with varying resistance to rotation, and means responsive to fluid pressure in the said inner chamber for controlling actuation of the said connecting means so that the K factor at stall varies inversely as the input torque varies and the impeller speed remains substantially constant.

3. A hydrodynamic torque converter as set forth in claim 2 wherein the said connecting means includes a friction brake.

4. A hydrodynamic torque converter as set forth in claim 2 wherein the said connecting means includes a fluid pressure actuated friction brake.

5. A hydrodynamic torque converter as set forth in claim 2 wherein the said controlling means includes a valve which opens at a predetermined fluid pressure in the said inner chamber.

6. A hydrodynamic torque converter comprising an impeller, a turbine, a stationary support, a first reactor fixed to the said support, the said first reactor including a hub, a second reactor mounted for rotation on the said support, the said impeller, turbine and reactors defining a torodial chamber and an inner chamber adapted to be filled with fluid, a friction brake for connecting the said second reactor to the said hub with varying resistance to rotation, a first bore in the said hub, a piston slidably disposed in the said first bore, a first fluid passage connecting the said first bore with the said inner chamber so that pressurized fluid supplied to the said first bore from the said inner chamber actuates the said piston to cause the said brake to engage, a step bore located in the said hub, the said step bore having a small diameter portion which communicates with the said first bore and a large diameter portion, a step valve having a large diameter portion slidably engaging the said large diameter step bore portion, a small diameter portion slidably engaging the said small diameter step bore portion, and a second fluid passage extending between the ends thereof, a spring disposed in the said step bore to resiliently bias the small diameter end of the said valve into fluid sealing engagement with the said piston, a third fluid passage venting the said large diameter step bore portion, and a fourth fluid passage connecting the said step bore with the said inner chamber so that pressurized fluid supplied to the said step bore acts on the said valve tending to move it against the bias of the said spring.

References Cited

UNITED STATES PATENTS

| | | | |
|---|---|---|---|
| 2,898,740 | 8/1959 | Kelley | 60—54 |
| 2,954,672 | 10/1960 | Mamo | 60—54 |
| 3,152,446 | 10/1964 | Foerster et al. | 60—54 |
| 3,358,444 | 12/1967 | Tuck | 60—54 |

EDGAR W. GEOGHEGAN, Primary Examiner